(12) United States Patent
Previdi et al.

(10) Patent No.: US 7,986,640 B2
(45) Date of Patent: Jul. 26, 2011

(54) TECHNIQUE FOR EFFICIENTLY DETERMINING ACCEPTABLE LINK-BASED LOOP FREE ALTERNATES IN A COMPUTER NETWORK

(75) Inventors: Stefano B. Previdi, Rome (IT); Raffaele Gigantino, Cava de' Tirreni (IT)

(73) Assignee: Cisco Technology, Inc., San Jose, CA (US)

( * ) Notice: Subject to any disclaimer, the term of this patent is extended or adjusted under 35 U.S.C. 154(b) by 702 days.

(21) Appl. No.: 11/481,350

(22) Filed: Jul. 5, 2006

(65) Prior Publication Data
US 2008/0008104 A1    Jan. 10, 2008

(51) Int. Cl.
*H04L 12/28* (2006.01)

(52) U.S. Cl. ........ 370/255; 370/217; 370/238; 370/254; 709/238

(58) Field of Classification Search ............... 370/216, 370/217, 238, 242, 254, 401; 709/238; 398/49–51, 398/54, 56
See application file for complete search history.

(56) References Cited

U.S. PATENT DOCUMENTS

| | | | |
|---|---|---|---|
| 5,964,841 A | 10/1999 | Rekhter | |
| 6,597,663 B1 | 7/2003 | Rekhter | |
| 6,751,746 B1 | 6/2004 | Jain et al. | |
| 6,765,880 B1 | 7/2004 | Hillard et al. | |
| 6,831,898 B1 | 12/2004 | Edsall et al. | |
| 6,850,486 B2 | 2/2005 | Saleh et al. | |
| 6,856,627 B2 | 2/2005 | Saleh et al. | |
| 6,879,783 B1* | 4/2005 | Nakahira | 398/51 |
| 6,987,740 B1 | 1/2006 | Di Benedetto et al. | |
| 2004/0039839 A1* | 2/2004 | Kalyanaraman et al. | 709/238 |
| 2004/0081154 A1 | 4/2004 | Kouvelas | |
| 2004/0117251 A1 | 6/2004 | Shand | |
| 2005/0073958 A1* | 4/2005 | Atlas et al. | 370/238 |
| 2005/0111351 A1* | 5/2005 | Shen | 370/217 |
| 2006/0187819 A1* | 8/2006 | Bryant et al. | 370/216 |
| 2007/0086361 A1* | 4/2007 | Allan et al. | 370/254 |

OTHER PUBLICATIONS

PCT Notification of Transmittal of the International Search Report and the Written Opinion of the International Searching Authority, or the Declaration, International Application No. PCT/US07/15454, International Filing Date Jul. 3, 2007, Date of Mailing Jan. 30, 2008, 9 pages.
Shand, M. et al., Network Working Group, Internet Draft, entitled IP Fast Reroute Framework (draft-ietf-rtgwg-ipfrr-framework-05.txt), Mar. 2006, IETF, pp. 1-14.
Atlas, A. et al., Network Working Group, Internet Draft, entitled Basic Specification for IP Fast-Reroute: Loop-Free Alternates (draft-ietf-rtgwg-ipfrr-spec-base-05), Feb. 2006, IETF, pp. 1-25.

(Continued)

*Primary Examiner* — Robert W Wilson
*Assistant Examiner* — Mohamed Kamara
(74) *Attorney, Agent, or Firm* — Cesari and McKenna, LLP

(57) ABSTRACT

A technique efficiently determines acceptable link-based loop free alternates (LFAS) in a computer network. According to the novel technique, a protecting network device configured to protect a link ("protected link") distinguishes other network devices (e.g., of the same domain as the protecting network device) as either network edge devices (i.e., an end point for external network traffic) or network core devices (i.e., not an end point for external network traffic). The protecting network device may then determine whether a neighboring network device loops toward a network edge device. If not, the protecting network device may determine that the neighboring network device is an acceptable LFA (e.g., for external network traffic). Notably, traffic directed to core devices may still loop, however, this traffic is generally internal (e.g., signaling) traffic, and may not be subject to the same operational constraints (e.g., protection) as external traffic.

27 Claims, 7 Drawing Sheets

OTHER PUBLICATIONS

Callon, R., Network Working Group, Request for Comments 1771, entitled Use of OSI IS-IS for Routing in TCP/IP and Dual Environments, Dec. 1990, IETF, pp. 1-80.

Rekhter, Y., et al., Network Working Group, Request for Comments 1771, entitled A Border Gateway Protocol (BGP-4), Mar. 1995, IETF, pp. 1-54.

Moy, J., Network Working Group, Request for Comments 2328, entitled OSPF Version 2, Apr. 1998, pp. 1-204.

Perlman, R., Interconnections Second Edition: Bridges, Routers, Switches, and Internetworking Protocols, Section 12.2.4, Addison Wesley Longman, Inc., pp. 317-319, 2000.

* cited by examiner

TECHNIQUE FOR EFFICIENTLY DETERMINING ACCEPTABLE LINK-BASED LOOP FREE ALTERNATES IN A COMPUTER NETWORK

BACKGROUND OF THE INVENTION

1. Field of the Invention

The present invention relates to computer networks and more particularly to efficiently determining acceptable link-based loop free alternates (LFAs) in a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs).

LANs typically connect the nodes over dedicated private communications links located in is the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain," and a router that interconnects different domains is generally referred to as a "border router."

Notably, service providers are often configured to relay traffic from one or more source customers to one or more destination customers, e.g., across a domain or the service provider's network. In particular, a network "edge" device (e.g., a border router) may receive data packets from an external network (e.g., a customer) that are to be forwarded to an external network destination (e.g., customer), typically interconnected to a different network edge device. Generally, the network edge devices may be interconnected by one or more network "core" devices within the service provider's network to transmit this "external network traffic" (or "customer traffic"). As used herein, a network edge device is a network device that is an end point for external network traffic, that is, external network traffic may enter or exit the provider network at the network edge device. Alternatively, a network core device is a network device that is not an end point for external network traffic, and is generally only utilized for internal transit of the external network traffic between network edge devices.

An example of an inter-domain routing protocol is the Border Gateway Protocol version 4 (BGP), which performs routing between domains (ASes) by exchanging routing and reachability information among neighboring inter-domain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGP-4)*, published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version* 2, dated April 1998 and the IS-IS protocol used in the context of IP is described in RFC 1195, entitled Use *of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its-routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state advertisements or link-state packets (or "IGP Advertisements") for exchanging routing information between interconnected intermediate network nodes (IGP nodes). As used herein, an IGP Advertisement generally describes any message used by an IGP routing protocol for communicating routing information among interconnected IGP nodes, i.e., routers and switches. Operationally, a first IGP node may generate an IGP Advertisement and "flood" (i.e., transmit) the packet over each of its network interfaces coupled to other IGP nodes. Thereafter, a second IGP node may receive the flooded IGP Advertisement and update its routing table based on routing information contained in the received IGP Advertisement. Next, the second IGP node may flood the received IGP Advertisement over each of its network interfaces, except for the interface at which the IGP Advertisement was received. This flooding process may be repeated until each interconnected IGP node has received the IGP Advertisement and updated its local routing table.

In practice, each IGP node typically generates and disseminates an IGP Advertisement whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

As noted, IGP Advertisements are usually flooded until each intermediate network IGP node has received an IGP Advertisement from each of the other interconnected intermediate nodes, which may be stored in a link state database (LSDB). Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation (notably, creating a "shortest path tree" or SPT, as will be understood by those skilled in the art).

Occasionally, a network element (e.g., a node or link) will fail, causing redirection of the traffic that originally traversed the failed network element to other network elements that bypass the failure. Generally, notice of this failure is relayed to the nodes in the network through an advertisement of the new network topology, e.g., an IGP or BGP Advertisement, and routing tables are updated to avoid the failure accordingly. Reconfiguring a network in response to a network element failure using, e.g., pure IP rerouting, can be time consuming. Many recovery techniques, however, are available to provide fast recovery and/or network configuration in the event of a network element failure, including, inter alia, "Fast Reroute", e.g., IP Fast Reroute (IP FRR). An example of IP FRR is described in Shand, et al., *IP Fast Reroute Framework* <draft-ietf-rtgwg-ipfrr-framework-05.txt>, Internet Draft, March 2006, and in Atlas, et al., *Basic Specification for IP Fast-Reroute: Loop-free Alternates* <draft-ietf-rtgwg-ipfrr-spec-base-05>, Internet Draft, February 2006, both of which are hereby incorporated by reference as though fully set forth herein.

IP-FRR has been deployed to protect against network element failures, where a protecting network node determines "Loop Free Alternates" (LFAs) of protected network elements to reach a particular destination. Specifically, a conventional LFA may generally be defined as an alternate next-hop node (i.e., not a current/selected next-hop node) or an alternate to other protected network elements (e.g., links) to the particular destination that does not loop back (return) to the protecting network device or the protected element (e.g., nodes/links) to reach that destination. For example, if a neighboring network device has selected the protecting network device as a next-hop to reach the destination, sending traffic from the protecting network device to that neighboring network device (e.g., in the event of a network element failure) would result in a loop between the two devices (e.g., until the network re-converges to remove the failed network element). By employing an LFA when the protected network element fails, however, traffic may be diverted to the LFA in order to reach the destination without utilizing the failed network element, and without creating any loops.

Generally, LFAs may be categorized into "link-based" LFAs and "prefix-based" LFAs. A conventional link-based LFA technique determines a backup route for all destination address prefixes that share a same next-hop/interface from the protecting network device. In other words, in the event a particular link fails (e.g., the next-hop node, interface, or link fails), all traffic, regardless of destination address prefix, may be diverted to a different link that has been determined not to return the traffic to the protecting network device, i.e., a link-based LFA. Link-based LFAs are relatively simple to manage, and are an attractive option to many service provider networks. However, link-based LFAs may be inefficient in many of existing network topologies, which often comprise many opportunities for loops, where conventional link-based LFA techniques may be unable to locate an LFA for a protected link. In particular, many service providers utilize "square" topologies within their "cores" (i.e., the portions of the service provider's network comprising network core devices), such square topologies resulting in fewer LFAs than other topologies, as will be understood by those skilled in the art. Accordingly, link-based LFAs may be simpler to implement, but at the same time may provide limited protection coverage.

Conventional prefix-based LFA techniques, on the other hand, may be used to determine a backup route for each destination address prefix (i.e., LFAs are calculated on a "per-prefix" basis). Each destination address prefix, then, may have a primary (i.e., a "selected" or "best") next-hop to reach the destination, as well as a prefix-based LFA. In the event of a failure of a network element, traffic whose destination address prefix would otherwise utilize the failed network element is diverted toward the LFA for that destination address prefix. While prefix-based LFAs may offer greater protection coverage than link-based LFAs (based on per-prefix computation, as will be understood by those skilled in the art), they can be more complex to manage and implement than link-based LFAs. In particular, during the detection of a failure, substantial changes are typically made to forwarding information bases (FIB) and forwarding tables in order to implement the prefix-based LFAs. That is, at failure detection, prefix-based LFAs require that each individual prefix is changed to an LFA, thus creating a performance cost proportional to the number of prefixes to change. Prefix-based LFAs may offer greater protection coverage, but at the same time these substantial changes may result in an unacceptable performance impact.

There remains a need, therefore, for an efficient LFA technique that is relatively simple to manage and implement. In particular, there remains a need for an LFA technique that extends protection coverage beyond that of conventional link-based LFAs, with better performance and simpler implementation than prefix-based LFAs.

SUMMARY OF THE INVENTION

The present invention is directed to a technique for efficiently determining acceptable link-based loop free alternates (LFAs) in a computer network. According to the novel technique, a protecting network device configured to protect a link ("protected link") distinguishes other network devices (e.g., of the same domain as the protecting network device) as either network edge devices (i.e., an end point for external network traffic) or network core devices (i.e., not an end point for external network traffic). The protecting network device may then determine whether a neighboring network device directs traffic towards (i.e., loops toward) a network edge device. If not (i.e., the neighboring network device only loops towards network core devices), the protecting network device may determine that the neighboring network device is an acceptable LFA (e.g., for external network traffic). Notably, traffic directed to core devices may still loop, however, this traffic is generally internal (e.g., signaling) traffic, and may not be subject to the same operational constraints (e.g., protection) as external traffic.

In accordance with one aspect of the present invention, each network device determines whether it is a network edge device or a network core device, e.g., through manual or dynamic configuration. For example, unless otherwise configured, the network devices may dynamically determine whether they are network edge devices by examining their Border Gateway Protocol (BGP) configuration. In particular, in the event the network device has any external (or exterior) BGP (eBGP) peers, or originates BGP routes, the network device is a network edge device (i.e., external network traffic may begin or end at the network device). Otherwise, i.e., the network device does not have any eBGP peers or does not originate BGP routes, the network device is a network core device (i.e., external network traffic does not begin or end at the network device).

In accordance with another aspect of the present invention, the protecting network device "learns" which network devices are network edge devices and which are network core devices, e.g., through manual or dynamic configuration. Illustratively, each network device of the network may utilize Interior Gateway Protocol (IGP) messages to advertise its state (edge or core) to each other network device. For instance, novel flags or extended fields may be employed within the IGP messages to relay the state of the network device. The protecting network device (e.g., and each other network device) stores the received information identifying network edge devices and network core devices, e.g., in a link-state database (LSDB).

In accordance with yet another aspect of the present invention, to determine acceptable LFAs, the protecting network device computes conventional link-based LFAs for a protected link of the protecting network device. If the protecting network device determines that there are no conventional LFAs available for the protected link, the protecting network device computes a shortest path tree (SPT) rooted at a neighboring network device. By examining branches of the SPT, the protecting network device may determine whether a particular branch containing the protected link also contains any network edge devices beyond the protected link (i.e., whether the neighboring network device would utilize the protected link to reach a network edge device with external network traffic). If not (i.e., the protected link would be used to reach only network core devices), the protecting network device may determine that the neighboring network device is an acceptable LFA for the protected link, since substantially all external network traffic is assumed to be destined to a network edge device.

Advantageously, the novel technique efficiently determines acceptable link-based LFAs in a computer network. By distinguishing between network edge devices and network core devices, the novel technique allows a protecting network device to determine acceptable link-based LFAs when conventional link-based LFA techniques suggest that no LFAs exist. In particular, the novel technique locates acceptable LFAs that may only loop towards network core devices, which are not end points for external network traffic, and are thus part of negligible loops. Also, the present invention expands the protection coverage of conventional link-based LFA techniques for more network topologies (i.e., with loops). Further, the dynamic aspects of the novel technique alleviate the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
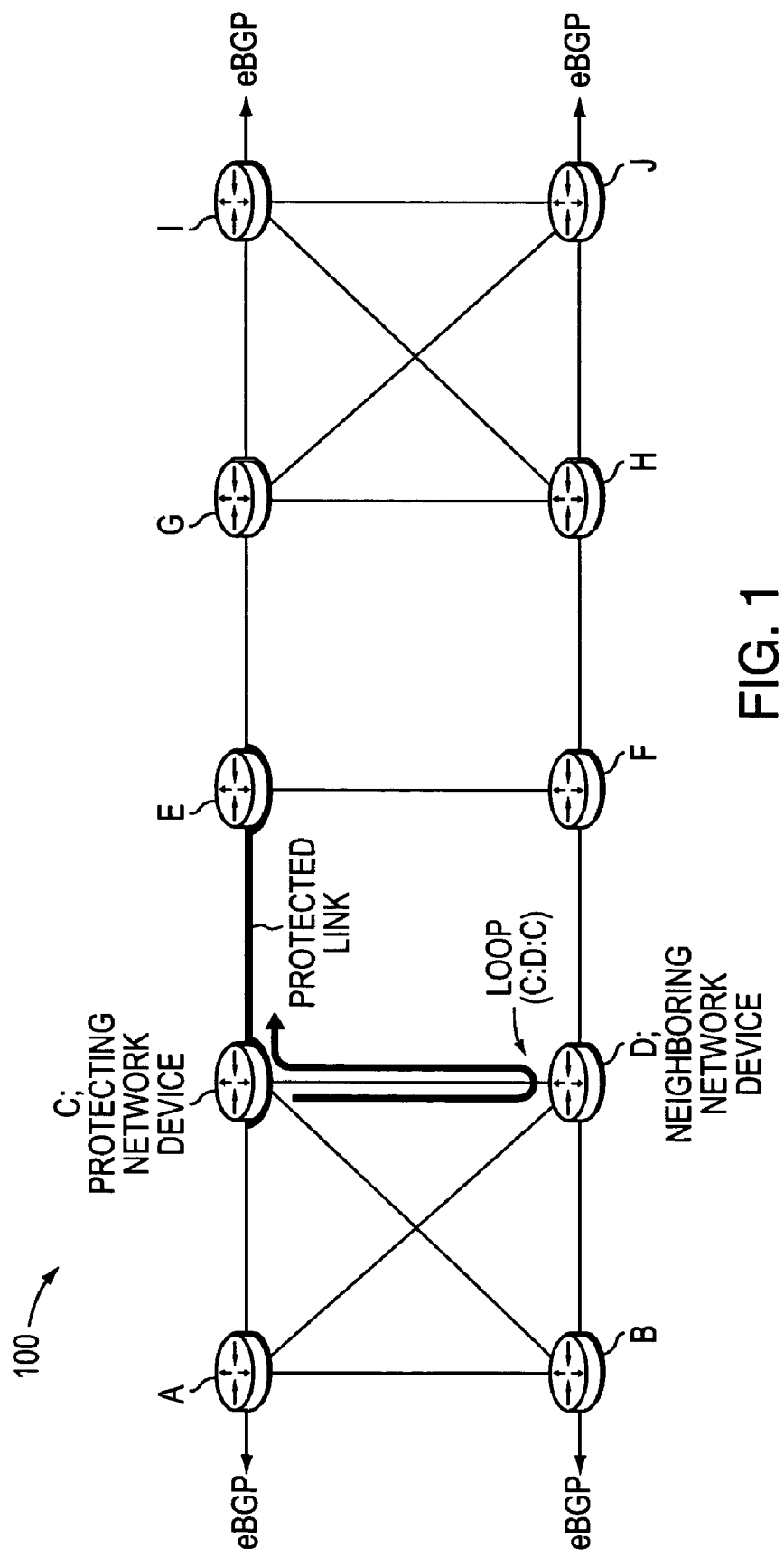
FIG. 1 is a schematic block diagram of an exemplary computer network that may be used in accordance with the present invention.

FIG. 1 is a schematic block diagram of an exemplary computer network 100 that may be advantageously used with the present invention. The network 100 comprises a plurality of interconnected network nodes/devices, such as Routers A-J. The routers may be interconnected by one or more links as shown, such as, e.g., over local area network (LAN) links, wireless LANs, etc., to form the network 100. As used herein, the links connecting the routers are referred to as the two network devices interconnected by the link. For example, B may be reached from A via Link A-B (or, notably, Link B-A). Illustratively, routers A-D are interconnected in a "full mesh" configuration where each router A-D is connected to each other router A-D via a link (G-J are also in a full mesh configuration). Also, routers C-F (and E-H) may be interconnected in a "square" or "box" configuration as shown and as will be understood by those skilled in the art. Network 100 may be configured as an autonomous system (domain), or as one or more areas or levels. Notably, the network 100 may be configured as a provider network interconnecting one or more external/customer networks (e.g., at routers A, B, I, and/or J), such as described herein. Those skilled in the art will understand that any number of network elements, e.g., devices, routers, links, etc., may be used in the computer network 100 and connected in a variety of ways, and that the view shown herein is for simplicity.

Data packets may be exchanged among the network devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers within the network/domain 100 using predetermined "interior" gateway protocols (IGPs), such as conventional distance-vector protocols or, illustratively, link state protocols, through the use of IGP advertisements, e.g., link state advertisements or link state packets. In addition, data packets containing network routing information may be exchanged throughout the network 100 (e.g., at enabled network edge devices) and other networks/domains (not shown) using "external" gateway protocols, such as the Border Gateway Protocol (BGP).

Figure 2:
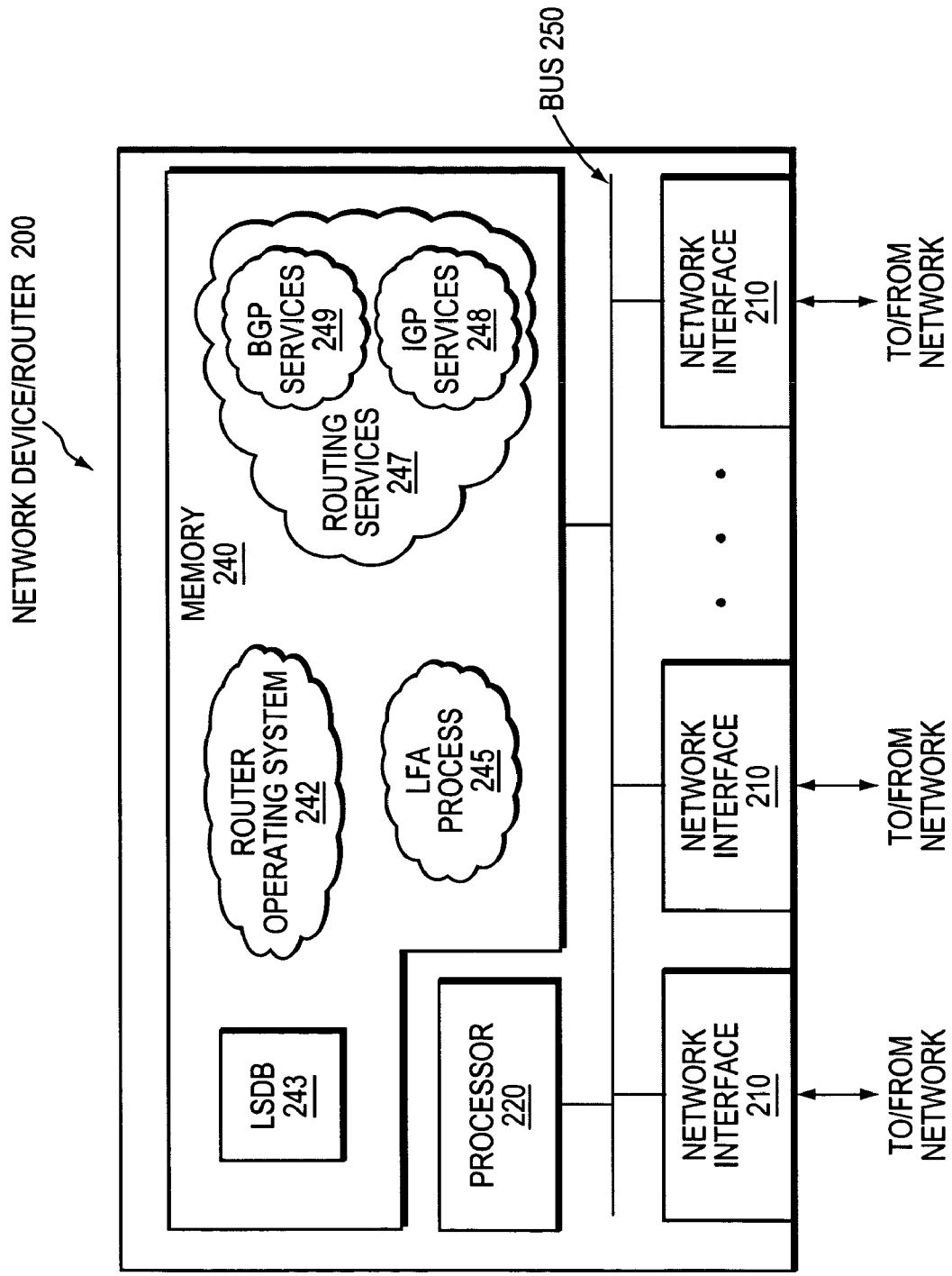
FIG. 2 is schematic block diagram of an exemplary network device/router that may be advantageously used with the present invention.

FIG. 2 is a schematic block diagram of an exemplary network device 200, which is illustratively a router that may be advantageously used with the present invention, e.g., as a network edge device and/or network core device. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data with interconnected network nodes using a variety of different communication protocols, including, inter alia, TCP/IP, UDP, ATM, RSVP, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as link state database (LSDB) 243. A router operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services may comprise routing services 247, IGP services 248, BGP services 249, and loop free alternates (LFA) process 245, in accordance with the present invention. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP as IGP services 248 (e.g., OSPF and IS-IS), BGP as BGP services 249, etc. These functions may be configured to manage a forwarding information database (not shown) containing, e.g., data used to make forwarding decisions. Illustratively, routing services 247 may compute shortest path trees (SPTs) using one or more path computation techniques, e.g., shortest path first, etc., as discussed above and will be understood further by those skilled in the art. Notably, routing services 247 may also perform functions related to virtual routing protocols, such as maintaining VRF instances (not shown) as will also be understood by those skilled in the art.

BGP services 249 may be used during communication of network reachability information among BGP-enabled devices 200 between the domains (i.e., network edge devices: A, B, I, and J), such as through the transmission and analysis of BGP advertisements. Operationally, a remote BGP device (e.g., of a remote domain) may establish a BGP session with a local BGP device (e.g., of the local domain, network 100), and transmit a generated BGP advertisement to the local BGP device. Thereafter, the local BGP device may receive the transmitted BGP advertisement and update its routing table based on routing information contained in the received BGP advertisement. Note that a BGP session between local and remote domains (interdomain) is an external (or exterior) BGP (eBGP) session. The local BGP device may then transmit the received BGP advertisement to other BGP devices of the local domain until each interconnected BGP device of the local domain has received the BGP advertisement and updated its local routing table. Note further that a BGP session within a domain (intradomain) is an internal BGP (iBGP) session. Also, in the event a new address prefix is established within an autonomous system or a new connection is created between two or more autonomous systems (e.g., between a provider network and one or more customer networks), updated BGP advertisements communicating the change may be transmitted between the BGP devices, as will be understood by those skilled in the art.

Changes in the network topology within the local domain (network 100) may be communicated among routers 200 within the network 100 using IGP services 248, such as the conventional OSPF and IS-IS link-state protocols. Suppose, for example, that a communication link fails or a cost value associated with a network node changes. Once the change in the network's state is detected by one of the routers, that router may flood an IGP advertisement/message communicating the change to the other routers in the network. In this manner, each of the routers eventually "converges" to an identical view of the network topology.

Figure 3:
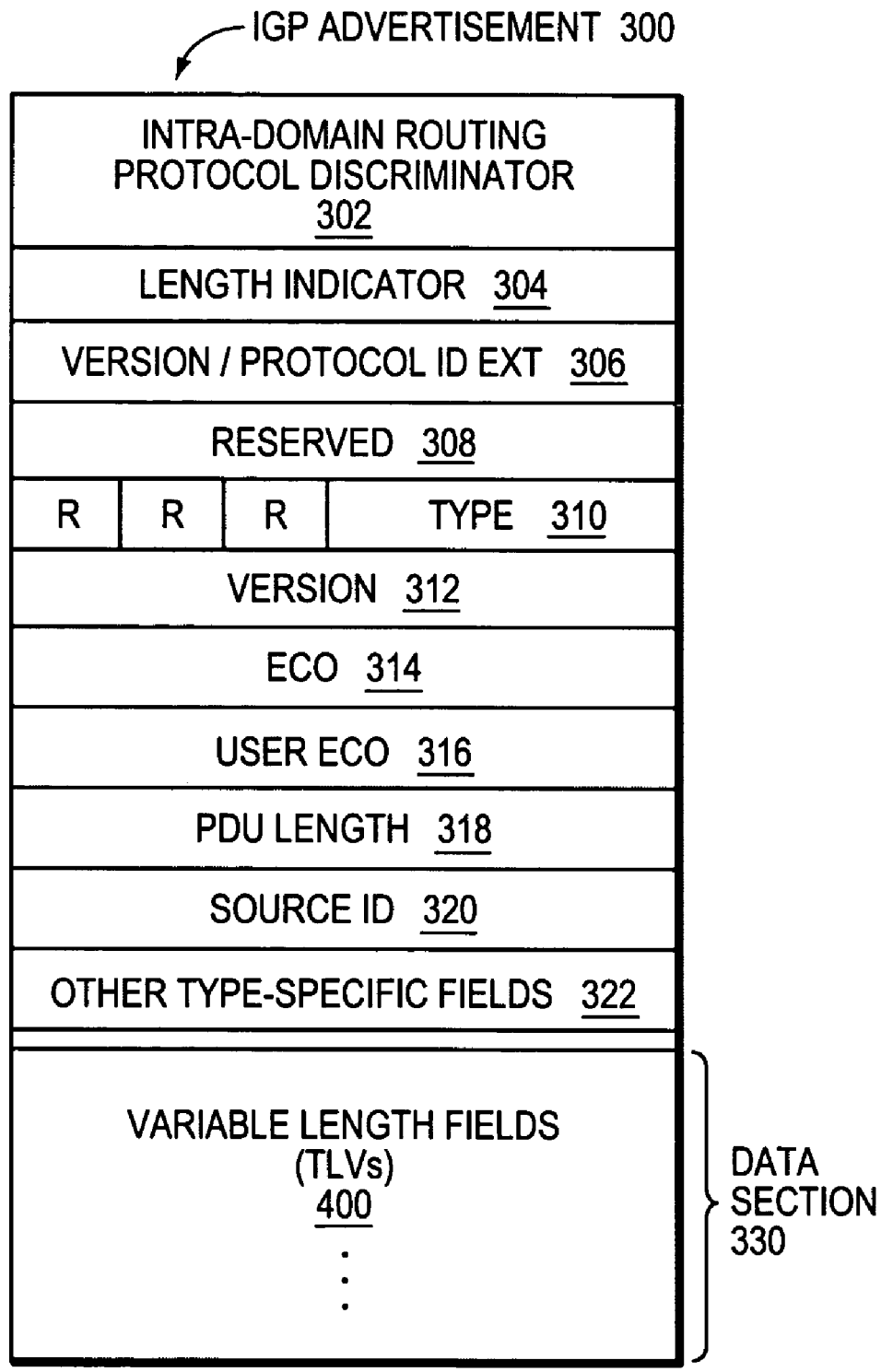
FIG. 3 is a schematic block diagram of an exemplary IGP Advertisement that may be transmitted by the routers.

FIG. 3 illustrates an exemplary IGP Advertisement 300 that may be flooded by the routers 200. Illustratively, IGP advertisement 300 is shown as an IS-IS link state packet. Those skilled in the art will understand, however, that other IGP advertisements may be used in accordance with the present invention, such as, e.g., OSPF link state advertisements, etc. The advertisement 300 includes an intra-domain routing protocol discriminator field 302 that stores a value identifying the specific protocol of the message (e.g., IS-IS), and a length indicator field 304 that stores a value indicating the length of the standard header for the advertisement. Also, a version/protocol ID extension (ext) field 306 may be used to further store a value defining the particular version of the protocol. Reserved field 308 and "R" fields are reserved for future use with the protocol, as are the ECO and User ECO fields 314 and 316, all of which are illustratively ignored by the receiving router until directed for decoding in future versions of the protocol.

A type field 310 (and corresponding version field 312) stores a value indicating the type (and version) of advertisement 300 being transmitted, which may define the existence of other type-specific fields 322 within the advertisement. For example, the type of advertisement may be a "Hello" packet, a link state packet, etc., as will be understood by those skilled in the art. The PDU length field 318 stores a value indicating the length of the entire PDU (Protocol Data Unit, or advertisement 300), including the header, type-specific fields, and data fields. A source ID field 320 stores a value that identifies the router that generated and originally broadcast the advertisement 300.

The other type-specific fields 322 may include any number of fields as defined by the protocol, such as checksum fields, maximum area address fields, etc., as understood by those skilled in the art. For example, a sequence-number field (not shown) may store a sequence number indicating the relative version of the advertisement 300. Typically, the sequence number stored in the field is incremented, e.g., by one, for every new version of the advertisement. The advertisement 300 is therefore considered "stale" (invalid) if its sequence number is less than the sequence number stored in a previously-received version of the advertisement, i.e., generated by the same advertising node. Accordingly, the routers 200 may be configured to store and forward only the most recent version of an advertisement, e.g., the version having the largest sequence number. A remaining lifetime field (not shown) may also be used to store a value that may be used for determining whether the advertisement 300 is valid. The remaining lifetime value is typically initialized to a non-zero integer value, often in units of seconds. The remaining lifetime value may be decremented, e.g., by one every second, until the remaining lifetime value reaches zero, thereby indicating that the advertisement has become invalid. That is, every router 200 that stores or floods the advertisement 300 continuously ages the packet until the remaining lifetime value equals zero. Those skilled in the art will appreciate that other aging mechanisms alternatively may be used, such as incrementing the advertisement remaining lifetime value from an initial value, e.g., equal to zero, until the remaining lifetime value reaches a known upper limit.

The data section 330 includes one or more variable length fields 400, which each have a specific type (or code), length, and value (TLV) as described further herein. For example, to advertise network topology, one or more pairs of neighboring-node fields (not shown) and cost fields (not shown) may be used. The neighboring-node fields may store a value, such as an address, indicating a network node that is directly accessible from the intermediate node identified in the source ID field 320. The cost field may store a value that has been associated, e.g., by the advertising node, with the network node identified in the neighboring-node field. It is noted that in other embodiments, a single neighboring node may be associated with a plurality of cost values. Other routing information may also be included in the variable length fields 400 of the IGP advertisement 300, such as checksum values, padding fields, proprietary fields, etc., and novel network device state (edge/core) fields, described further below. Generally, the received IGP advertisements are stored in LSDB 243 of the router 200.

In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
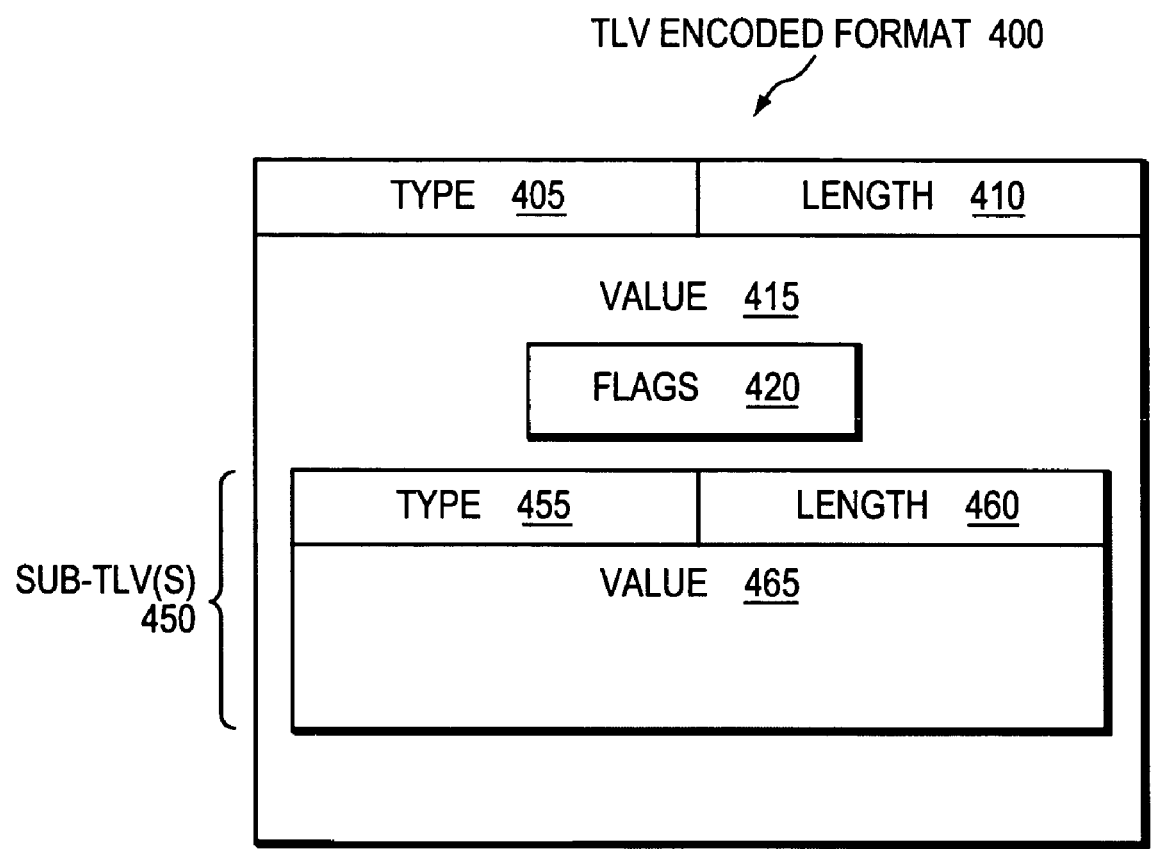
FIG. 4 is a schematic block diagram illustrating a variable length field (TLV) that may be advantageously used with the present invention.

FIG. 4 is a schematic block diagram illustrating the TLV encoded format 400 that may be advantageously used with the present invention. The TLV 400 may be used for a variable length field contained in an IGP advertisement 300, or other protocol messages in accordance with the present invention. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the present invention.

LFA process 245 contains computer executable instructions executed by processor 220 to perform functions relating to conventional LFA techniques (e.g., link-based and/or prefix-based). In particular, LFA process 245 may be configured to determine one or more LFAs for a protected network element as mentioned above. As used herein, an LFA may generally be defined as an alternate next-hop node (i.e., not a current/selected next-hop node) or an alternate to other protected network elements (e.g., links) to the particular destination that does not "loop back" (return) traffic to the protecting network device or the protected element (e.g., nodes/links). Additionally, LFA process 245 may be configured to perform functions relating to the novel LFA (extended) techniques described herein.

The present invention is directed to a technique for efficiently determining acceptable link-based LFAs in a computer network. According to the novel technique, a protecting network device configured to protect a link ("protected link") distinguishes other network devices (e.g., of the same domain as the protecting network device) as either network edge devices (i.e., an end point for external network traffic) or network core devices (i.e., not an end point for external network traffic). The protecting network device may then determine whether a neighboring network device directs traffic towards (i.e., loops towards) a network edge device. If not (i.e., the neighboring network device only loops towards network core devices), the protecting network device may determine that the neighboring network device is an acceptable LFA (e.g., for external network traffic).

In accordance with one aspect of the present invention, each network device of the network 100 (e.g., routers A-J) determines whether it is a network edge device or a network core device, e.g., through manual or dynamic configuration. For example, unless otherwise configured, the network devices may dynamically determine whether they are network edge devices by examining their BGP configuration, such as through BGP services 249. In particular, a network edge device may be defined as a network device which is an end point for external network traffic into and/or out of the network 100, e.g., either receiving traffic from external sources (e.g., customers) or transmitting traffic to external destinations (e.g., customers). A network device that may transmit or receive external traffic may generally be assumed to have one or more eBGP sessions with neighboring external network devices (not shown). Accordingly, in the event a network device has any eBGP peers, the network device may determine that it is a network edge device. For example, each network device A, B, I, and J has an eBGP session with an external network device as shown in FIG. 1 and, as such, may determine that it is a network edge device in accordance with the present invention.

Alternatively or in addition, a network device may determine that it is a network edge device in the event it originates BGP routes, for example, for Multiprotocol Label Switching Virtual Private Networks (MPLS VPNs) as will be understood by those skilled in the art. MPLS VPNs are described further in RFC 4364, entitled *BGP/MPLS IP Virtual Private Networks (VPNs)*, by E. Rosen et al., published February 2006, which is hereby incorporated by reference as though fully set forth herein. By examining BGP configuration through BGP services 249, a network device may determine whether any BGP routes originate from the device and if so, the network device may conclude that it is a network edge device accordingly.

When it does not have any eBGP peers or does not originate BGP routes, the network device may determine that it is a network core device (i.e., external network traffic does not begin or end at the network device). In particular, network core devices are generally used only internally to the network 100 for the transit of traffic (e.g., external traffic) from one network edge device to another, and do not originate or terminate external network traffic (e.g., customer traffic). Illustratively, Routers C-H in FIG. 1 are core routers, as each does not have an eBGP session nor originates any BGP routes.

Alternatively, manual configuration as a network edge device or network core device may be performed, e.g., by a system administrator or may be otherwise statically configured at the network device. For example, certain network devices may be configured specifically to operate only as one particular device, e.g., edge or core, and may be pre-configured as such. Also, during configuration of the network 100, a system administrator may determine which network devices are edge devices and which are core devices, and may manually configure the devices accordingly. Other reasons and methods for manually configuring the devices will be understood by those skilled in the art. Notably, manual configuration may or may not preempt dynamic configuration. For instance, a network device (e.g., B) may dynamically determine that it has an eBGP session with an external network device, and thus that it is a network edge device. However, a system administrator may determine that network device B may not receive any external network traffic (e.g., maintains an eBGP session for other reasons), and thus may be configured as a "core" device.

In accordance with another aspect of the present invention, a protecting network device, e.g., C (and possibly other devices of the network 100), learns which network devices are network edge devices and which are network core devices, e.g., through manual or dynamic configuration. Manual configuration, again, may be performed by a system administrator with knowledge of the network topology, who may statically configure the protecting network device with the state information of each other network device in the network 100 (e.g., as either an edge device or a core device).

Illustratively, for dynamic learning in accordance with the present invention, each network device may utilize IGP messages/advertisements 300 (e.g., within a Router Capability link-state packet in IS-IS, or a Router Information link-state advertisement in OSPF, as will be understood by those skilled in the art) to advertise its state (edge or core) to each other network device. In particular, the state of a particular device, notably a novel added characteristic of the device, may be contained within the IGP advertisement 300, for example, through the use one or more novel flags or extended fields (TLVs 400, e.g., with flags field 420). For instance, the value field 415 of a specific type 405 of TLV may include information specifying whether the advertising network device is a network edge device or a network core device. Illustratively, this information may be embodied within flags field 420 as a one-bit indication (e.g., core or edge), a two-bit indication (e.g., core, edge, other, unable to determine, etc.), etc. Notably, other embodiments of specifying information/fields will be understood by those skilled in the art, and such embodiments are within the scope of the present invention as described herein.

These IGP advertisements 300 may be flooded among the network devices within the network 100 (e.g., area/level-wide flooding scope), such that each network device may receive the state information of each other network device of the network. The protecting network device (e.g., and each other network device) may then store the received information identifying network edge devices and network core devices of the network 100, e.g., in LSDB 243 (illustratively, network devices A, B, I, and J as network edge devices, and network devices C-H as network core devices in FIG. 1). Notably, the state information stored in accordance with the present invention may pertain to a single LSDB 243, and thus to a single routing area/level, as will be understood by those skilled in the art.

While the above description describes manual configurations (e.g., system administrator configuration) or dynamic configurations (e.g., configuration performed by the device itself, without system administrator intervention) for determining a network device state and learning other network device states, it is important to note that the two configurations are not mutually exclusive in accordance with the present invention. In other words, a network device may be partially configured for either manual or dynamic configurations. For instance, not all network devices of the network 100 must be configured in the same manner. Further, while one particular network device may be manually/dynamically configured in accordance with one aspect of the present invention, that particular network device need not be manually/dynamically configured in accordance with another aspect of the present invention. In addition, to learn other network device states in accordance with the present invention, a network device may manually configure certain network device states, while dynamically learning others. Other combinations of manual and dynamic configurations may be appreciated by those skilled in the art, and such combinations may be used with the present invention accordingly.

In accordance with yet another aspect of the present invention, to determine acceptable LFAs, the protecting network device (e.g., network device C) computes conventional link-based LFAs for a protected link of the protecting network device (e.g., Link C-E). An example conventional LFA technique is described in the above-incorporated Internet Draft by Atlas, et al., *Basic Specification for IP Fast-Reroute: Loop-free Alternates*. Briefly, the protecting network device determines whether any of its neighboring network devices, other than the protected network device at the other end of the protected link (e.g., neighboring network devices A, B, or D), would bypass the protected elements (e.g., Link C-E and/or network device E). For example, assume that each link of the network 100 in FIG. 1 has an equal cost. Those skilled in the art will understand that if traffic toward downstream network device G were redirected from the protecting network device C to the neighboring network devices A or B, both neighboring network devices would return (loop) the traffic back to the protecting network device according to their local SPTs (e.g., the shortest path is three hops, through the protected elements). Also, neighboring network device D may or may not loop the traffic (e.g., all paths from D to G are three hops), so the protecting network device is conventionally unable to conclude that D would not loop traffic back (as shown in FIG. 1, designated as "C:D:C").

Figure 5:
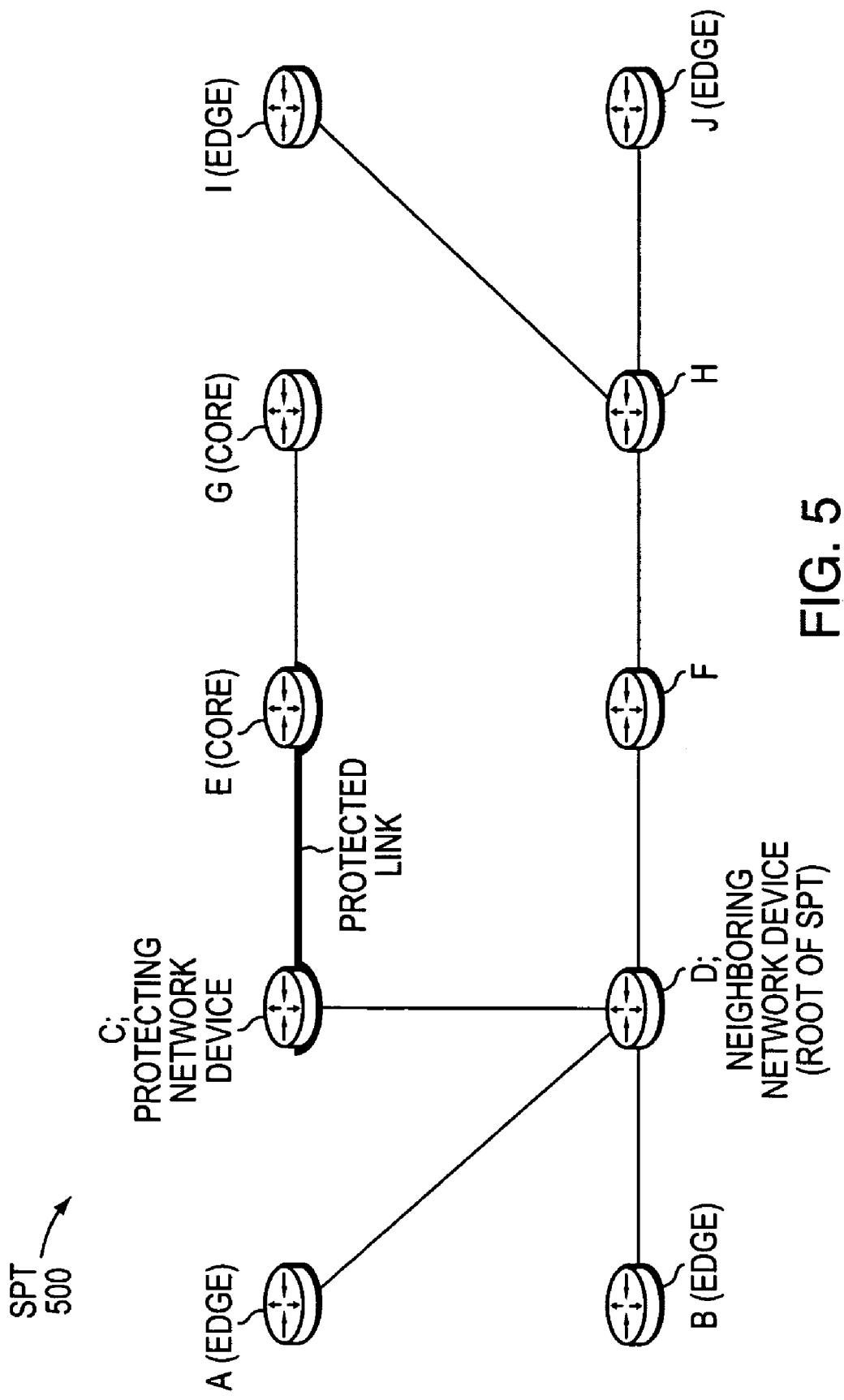
FIG. 5 is a schematic block diagram of an illustrative SPT of a network device in the computer network in FIG. 1 in accordance with the present invention.

If the protecting network device C determines that there are no conventional LFAs available for the protected link (as mentioned above), the protecting network device computes an SPT rooted at a (e.g., non-LFA) neighboring network device (e.g., each non-LFA neighboring network device A, B, and D). Illustratively, FIG. 5 is a schematic block diagram of an illustrative SPT 500 of a neighboring network device (e.g., D) in the computer network 100 in FIG. 1 in accordance with the present invention. The SPT 500 may be computed using known techniques, such as SPF computations, etc., and may be used by the protecting network device to determine the paths used by the neighboring network node to reach various destinations within the network 100.

By examining branches of the SPT 500, the protecting network device C may determine whether a particular branch containing the protected link also contains any network edge devices beyond the protected link. For instance, the protected link C-E is contained on the SPT branch D-C-E-G, as will be understood by those skilled in the art. By comparing the network devices of the branch (notably, network devices beyond the protected link, therefore, devices E and G) to the learned state information described above (e.g., stored in LSDB 243), the protecting network device may determine whether any of the network devices are network edge devices. As determined above (and as can be seen in FIG. 5), network devices E and G are both network core devices, and will thus not be end points for any external traffic (e.g., customer traffic). In particular, the network edge devices of the network, e.g., network edge devices A, B, I, and J, are each located on a branch of the SPT that does not include the protected elements (e.g., Link C-E). Therefore, it may be determined by the protecting network device C that the neighboring network device D would not utilize the protected link C-E to reach a network edge device with external network traffic, and would thus not loop external traffic back to the protected link C-E.

If the non-LFA neighboring network device D does not utilize the protected element (Link C-E) to reach any network edge devices, the protecting network device C may determine that the neighboring network device is an acceptable LFA for the protected element (Link C-E). Specifically, it can be assumed that substantially all external traffic (customer traffic) traversing the network 100 will only be destined to a network edge device. That is, in the illustrative example described herein, a provider network generally is neither the source nor destination of external/customer traffic, and acts as a transit connection between two or more customer network devices. Most of the traffic in the network 100, therefore, is external traffic destined for one of the network edge devices. As a result, substantially all traffic redirected to an acceptable LFA will not loop towards the protected element, since the protected element would only be used by the acceptable LFA for non-external/customer traffic. For instance, if the acceptable LFA neighboring network device D receives redirected traffic from the protecting network device C, it is substantially likely that the traffic is to be forwarded to a network edge device, A, B, I, or J. Although the neighboring network device D may have one or more loops to the protected element (Link C-E), the loops are only to network core devices (E and G). Thus, the only traffic impacted by the loops is traffic destined for the network core devices, which most likely is not external traffic (e.g., management traffic, updates, connectivity protocol messages, etc.), as will be understood by those skilled in the art. This "internal" traffic is generally not subject to the same operational constraints as external traffic, and thus is not considered to create an "unacceptable loop" for determining acceptable LFAs, in accordance with the present invention.

The acceptable LFAs may be used by the protecting network device C in the same manner as conventional LFAs, as described herein and as will be understood further by those skilled in the art. In the event, however, that there are no acceptable LFAs available to the protecting network device C, the protecting network device may return errors to a system administrator, or may simply not be able to protect the protected element. Notably, while the above technique to determine acceptable LFAs has been illustratively described as a dynamic process within the protecting network device, the present invention may also be utilized by network devices other than the actual protecting network device (e.g., a management device), or by manual determination and configuration by a system administrator.

Figure 6:
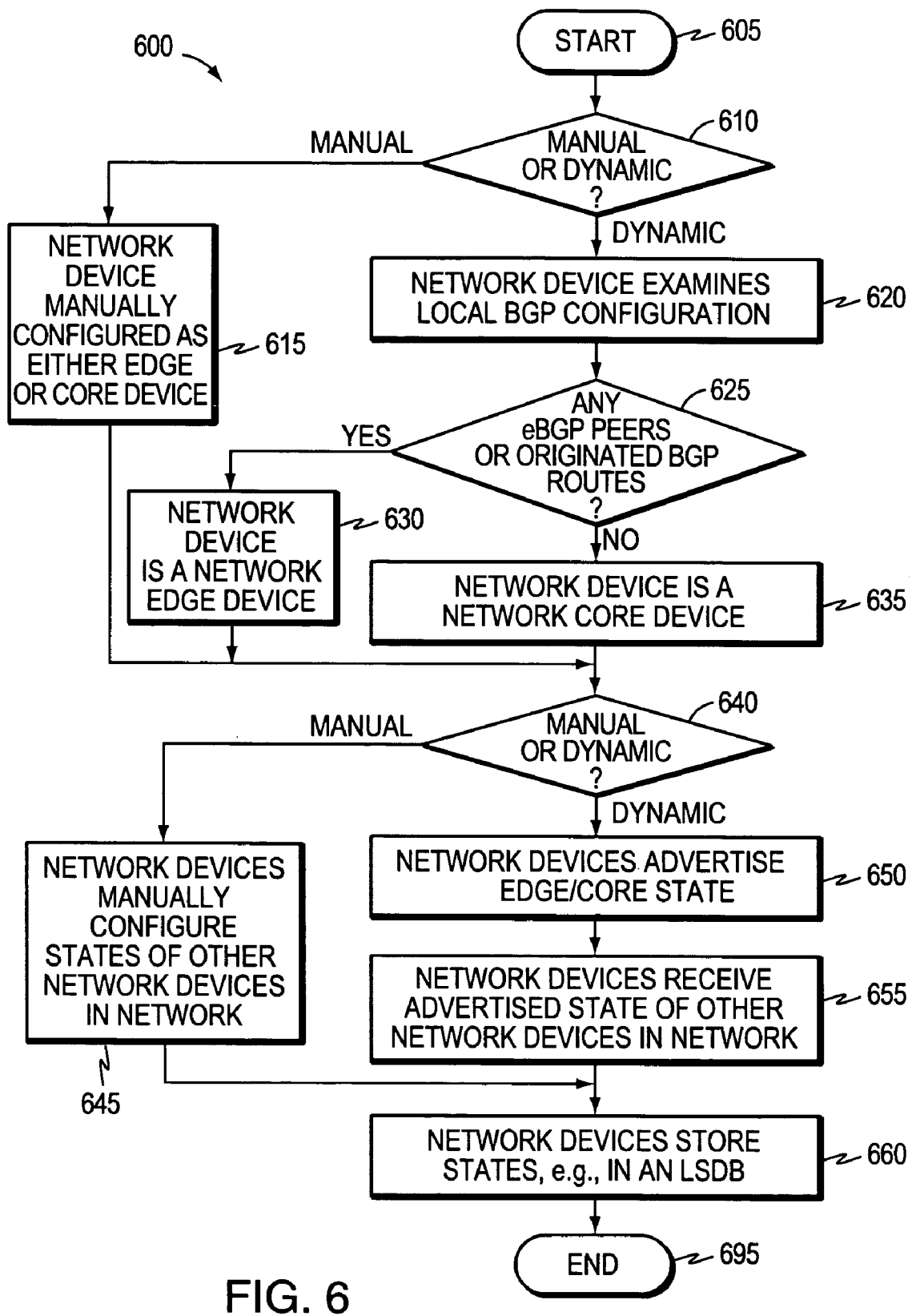
FIG. 6 is a flowchart illustrating a procedure for distinguishing between network edge devices and network core devices in accordance with the present invention.

FIG. 6 is a flowchart illustrating a procedure for distinguishing between network edge devices and network core devices in accordance with the present invention. The procedure 600 starts at step 605, and continues to step 610, where a network device (A-J) may be either manually or dynamically configured as either a network edge device or a network core device. If manually configured, the network device is manually configured in step 615 as either a network edge device or a network core device, as described above. If at step 610 the network device is to be dynamically configured, the network device examines its local BGP configuration (e.g., in BGP services 249) in step 620. In the event the network device has any eBGP peers or originates any BGP routes in step 625, the network device determines that it is a network edge device in step 630. If, on the other hand, the network device does not have any eBGP peers or does not originate any BGP routes in step 625, the network device determines that it is a network core device in step 635.

At step 640, the network devices may either manually or dynamically update/store the states (i.e., edge or core) of other network devices. If manually configured, the network devices manually configure the states of other network devices in the network 100 in step 645, and stores them in step 660, e.g., in LSDB 243. If at step 640 the network devices are configured to dynamically update/store states, the network devices may advertise their respective edge/core states into the network in step 650, such as, e.g., through IGP advertisements 300. As the network devices receive advertised states of other network devices in the network in step 655, the states are stored in step 660. The procedure 600, with determined and learned network device states (edge or core), ends in step 695. Notably, while the above description mentions manual or dynamic configurations, the two configurations are not mutually-exclusive, and a network device may be partially configured for either manual or dynamic configurations, as described further above.

Figure 7:
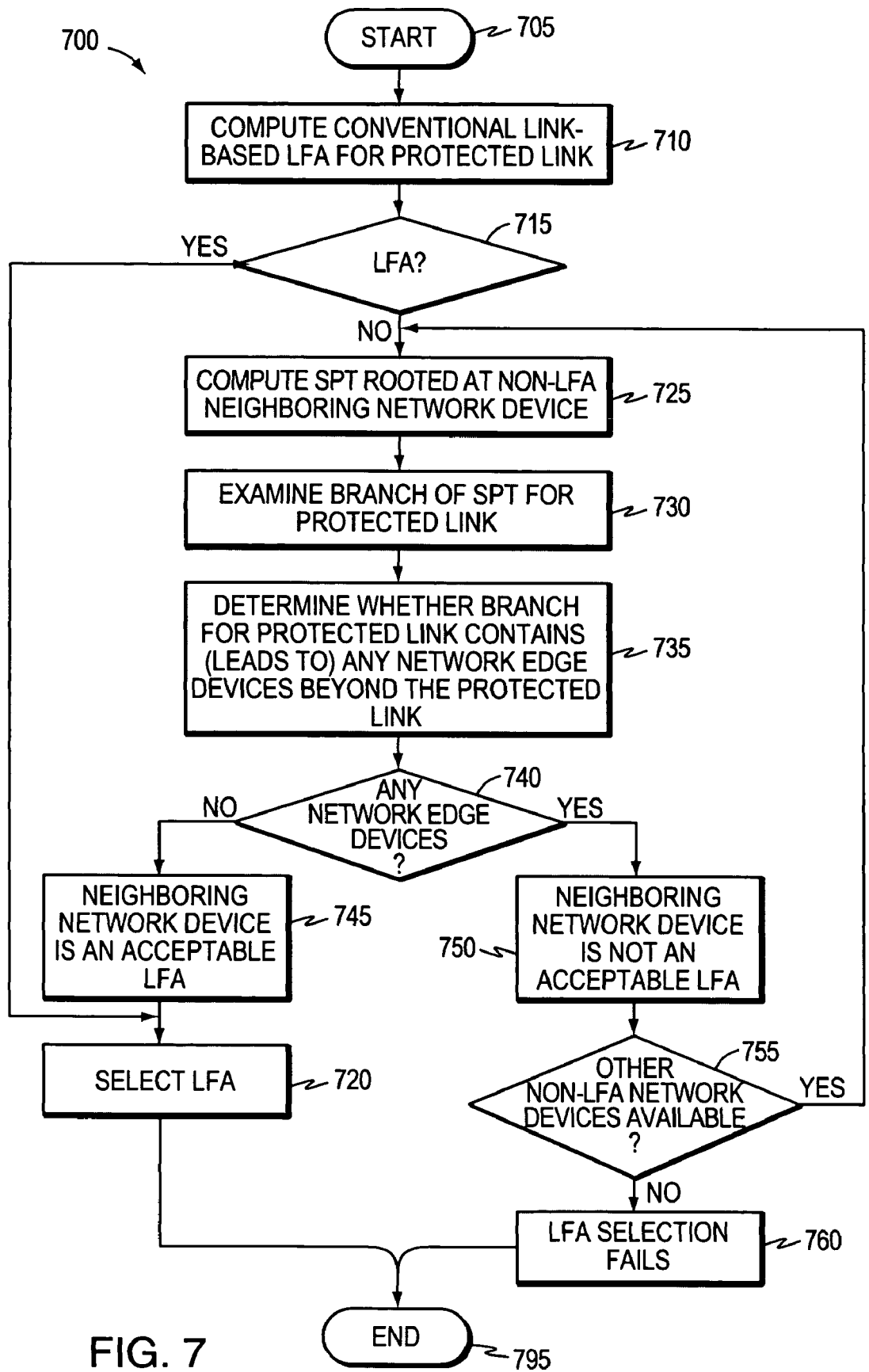
FIG. 7 is a flowchart illustrating a procedure for efficiently determining acceptable link-based LFAs in accordance with the present invention.

FIG. 7 is a flowchart illustrating a procedure for efficiently determining acceptable link-based LFAs in accordance with the present invention. The procedure 700 starts at step 705, and continues to step 710, where a protecting network device (e.g., network device C) computes a conventional link-based LFA for a protected link (e.g., link C-E). If a conventional LFA is found in step 715, the LFA is selected in step 720, and the procedure ends in step 795. If, however, no conventional link-based LFA is found in step 715, the protecting network device computes an SPT rooted at a non-LFA neighboring network device in step 725 (e.g., neighboring network device D). By examining the branch of the SPT for the protected link in step 730 (D-C-E-G, as described above), the protecting network node may determine in step 735 whether that branch contains (e.g., leads to) any network edge devices beyond the protected link, such as by comparing the network devices of the branch to the states stored in LSDB 243 (see, for example, FIG. 6). If at step 740 there are no network edge devices along the protected link's branch, the neighboring network device (D) is determined to be an acceptable LFA in step 745, as described above. The acceptable LFA neighboring network device may then be selected as the LFA in step 720, and the procedure ends in step 795. If, on the other hand, there is at least one network edge device on the branch of the protected link in step 740, the neighboring network device is determined not to be an acceptable LFA in step 750. If other non-LFA neighboring network devices are available to the protecting network device in step 755, the procedure 700 returns to step 725 to compute another SPT rooted at the available neighbor. Otherwise, the LFA selection fails in step 760, and the procedure 700 ends in step 795 (e.g., after errors, etc., described above).

Advantageously, the novel technique efficiently determines acceptable link-based LFAs in a computer network. By distinguishing between network edge devices and network core devices, the novel technique allows a protecting network device to determine acceptable link-based LFAs when conventional link-based LFA techniques suggest that no LFAs exist. In particular, the novel technique locates acceptable LFAs that may only loop to network core devices, which are not end points for external network traffic, and are thus part of negligible loops. Also, the present invention expands the protection coverage of conventional link-based LFA techniques for more network topologies (i.e., with loops). Further, the dynamic aspects of the novel technique alleviate the need for cumbersome manual configuration.

While there has been shown and described an illustrative embodiment that efficiently determines acceptable link-based LFAs in a computer network, it is to be understood that various other adaptations and modifications may be made within the spirit and scope of the present invention. For example, the invention has been shown and described herein for use with network devices arranged in square (box) topologies. However, the invention in its broader sense is not so limited, and may, in fact, be used with other non-loop free topologies, as will be understood by those skilled in the art. Also, while the above description describes utilizing IGP advertisements 300 to relay the network device states, those skilled in the art will understand that other communication means may be utilized in accordance with the present invention, e.g., specific protocols designed to transmit the information.

Further, while the above description illustratively utilizes a provider network with network core and edge devices as will be understood by those skilled in the art, the present invention may also be applied to other network configurations. For instance, a network edge device may be a network device connected to one or more destination network devices (e.g., end-stations, servers, etc.), while network core devices may be a network device not connected to any destination network devices (e.g., a router only transmitting traffic to other routers). In other words, an acceptable LFA may be determined based on whether the SPT branch looping through the protected elements will be used to reach destination network devices, accordingly.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A network device for efficiently determining acceptable link-based loop free alternates (LFAs) in a computer network to protect a protected element, the network device comprising:
    one or more network interfaces;
    a processor coupled to the one or more network interfaces and configured to execute an LFA process; and
    a memory configured to store the LFA process executable by the processor, the LFA process configured to: i) distinguish one or more other network devices of the network as network edge devices or network core devices, ii) determine whether a branch, of a shortest path tree (SPT) rooted at a neighboring network device, that includes the protected element, leads toward a network edge device, and iii) if the branch, of the SPT rooted at the neighboring network device, that includes the protected element, does not lead toward a network edge device, determine that the neighboring network device is an acceptable LFA.

2. The network device as in claim 1, wherein the LFA process is further configured to:
    distinguish the one or more other network devices of the network as network edge devices or network core devices (a state of the network devices) by learning a plurality of states from the one or more other network devices.

3. The network device as in claim 2, wherein the one or more network interfaces are configured to:
    receive one or more Interior Gateway Protocol (IGP) advertisements from the one or more other network devices, the IGP advertisements having state information of the one or more other network devices.

4. The network device as in claim 3, wherein the state information of the one or more other network devices is contained within one or more flags of the IGP advertisement.

5. The network device as in claim 1, wherein the protected element is a protected link, and the LFA process is further configured to:
   compute link-based LFAs for the protected link at a protecting network device;
   determine that no LFA is available for the protected link; and
   in response, determine the acceptable LFA.

6. The network device as in claim 1, wherein the protected element is a protected link, and the LFA process is further configured to:
   compute the SPT rooted at the neighboring network device, the SPT having one or more branches;
   examine the branch of the SPT that includes the protected link; and
   determine the branch of the SPT that includes the protected link leads toward a network edge device if there are any network edge devices on the branch of the SPT that includes the protected link beyond the protected link.

7. The network device as in claim 1, wherein the acceptable LFA loops to network core devices of the network.

8. The network device as in claim 1, wherein the protected element is a protected link, and the LFA process is further configured to:
   detect a failure of the protected link; and
   redirect traffic from the protected link to the acceptable LFA, wherein substantially all redirected traffic is external network traffic destined to a network edge device of the network.

9. A method for efficiently determining acceptable link-based loop free alternates (LFAs) in a computer network to protect a protected element, the method comprising:
   distinguishing one or more other network devices of the network as network edge devices or network core devices;
   determining whether a branch, of a shortest path tree (SPT) rooted at a neighboring network device, that includes the protected element, leads toward a network edge device; and
   if the branch, of the SPT rooted at the neighboring network device, that includes the protected element, does not lead toward a network edge device, determining that the neighboring network device is an acceptable LFA; and
   redirect traffic from the protected element to the acceptable LFA.

10. An apparatus for efficiently determining acceptable link-based loop free alternates (LFAs) in a computer network to protect a protected element, the apparatus comprising:
    means for distinguishing one or more other network devices of the network as network edge devices or network core devices;
    means for determining whether a branch, of a shortest path tree (SPT) rooted at a neighboring network device, that includes the protected element, leads toward a network edge device; and
    means for determining that the neighboring network device is an acceptable LFA, when the neighboring network device does not lead toward a network edge device.

11. A system for use with efficiently determining acceptable link-based loop free alternates (LFAs) in a computer network to protect a protected element, the system comprising:
    a plurality of network devices configured to operate as one of either a network edge device or a network core device; and
    a protecting network device configured to: i) distinguish between the network edge devices and the network core devices of the plurality of network devices, ii) determine whether a branch, of a shortest path tree (SPT) rooted at a neighboring network device of the protecting network device, that includes the protected element, leads toward a network edge device, and iii) if the branch, of the SPT rooted at the neighboring network device, that includes the protected element, does not lead toward a network edge device, determine that the neighboring network device is an acceptable LFA.

12. The system as in claim 11, wherein at least one of the plurality of network devices is configured to:
    determine whether the network device is a network edge device or a network core device.

13. The system as in claim 12, wherein the at least one network device is configured to:
    determine whether the network device is a network edge device or a network core device by examining a local Border Gateway Protocol (BGP) configuration.

14. The system as in claim 13, wherein the at least one network device is configured to:
    determine whether the BGP configuration indicates at least one external BGP (eBGP) session; and
    if so, determine that the network device is a network edge device.

15. The system as in claim 13, wherein the at least one network device is configured to:
    determine whether the BGP configuration indicates at least one originated BGP route; and
    if so, determine that the network device is a network edge device.

16. The system as in claim 13, wherein the at least one network device is configured to:
    determine whether the BGP configuration indicates at least one of either at least one external BGP (eBGP) session or at least one originated BGP route;
    if so, determine that the network device is a network edge device; and
    if not, determine that the network device is a network core device.

17. The method of claim 9 wherein the distinguishing determines whether a network device is a network edge device or a network core device based on a Border Gateway Protocol (BGP) configuration.

18. A method comprising:
    attempting to find, by a protecting network device of a network, a link-based loop free alternate (LFA) for a protected element the network, where the link-based LFA does not create a loop for traffic directed to destinations located internal to, and external to, the network;
    determining that no such LFA exists;
    computing a shortest path tree (SPT) rooted at a neighboring network device to the protected element, the SPT having one or more branches that include network devices;
    determining whether a particular branch of the SPT that contains the protected element contains any network edge devices beyond the protected element;
    if the particular branch of the SPT containing the protected element contains any network edge devices beyond the protected element, determining that the neighboring network device is not an acceptable LFA for the protected element; and if a particular branch of the SPT containing the protected element does not contain any network edge devices beyond the protected link, determining that the neighboring network device is an acceptable LFA for the protected element.

19. The method of claim 18, further comprising:
distinguishing whether each of the network devices is a network edge device or is a network core device.

20. The method of claim 18, further comprising:
learning whether each of the network devices is a network edge device or is a network core device from one or more received Interior Gateway Protocol (IGP) advertisements from the network devices, the IGP advertisements having state information indicative thereof for the network devices.

21. The method of claim 20 wherein the state information is contained within one or more flags of the IGP advertisements.

22. The method of claim 18, wherein the acceptable LFA loops toward network core devices of the network.

23. An apparatus comprising:
one or more network interfaces;
a processor coupled to the one or more network interfaces and configured to execute a loop free alternate (LFA) process; and
a memory configured to store the LFA process executable by the processor, the LFA process configured to attempt to find a link-based LFA for a protected element of a network where the link-based LFA does not create a loop for traffic directed to destinations located internal to, and external to, the network,
determine that no such LFA exists,
compute a shortest path tree (SPT) rooted at a neighboring network device to the protected element, the SPT having one or more branches that include network devices,
determine whether a particular branch of the SPT that contains the protected element contains any network edge devices beyond the protected element,
if the particular branch of the SPT containing the protected element contains any network edge devices beyond the protected element, determine that the neighboring network device is not an acceptable LFA for the protected element, and
if a particular branch of the SPT containing the protected element does not contain any network edge devices beyond the protected link, determine that the neighboring network device is an acceptable LFA for the protected element.

24. The apparatus of claim 23, wherein the LFA process is further configured to distinguish whether each of the network devices is a network edge device or is a network core device.

25. The apparatus of claim 23, wherein the LFA process is further configured to learn whether each of the network devices is a network edge device or is a network core device from one or more received Interior Gateway Protocol (IGP) advertisements from the network devices, the IGP advertisements having state information indicative thereof for the network devices.

26. The apparatus of claim 25, the state information is contained within one or more flags of the IGP advertisements.

27. The apparatus of claim 23, wherein the acceptable LFA loops toward network core devices of the network.

* * * * *

UNITED STATES PATENT AND TRADEMARK OFFICE
CERTIFICATE OF CORRECTION

| | | |
|---|---|---|
| PATENT NO. | : 7,986,640 B2 | Page 1 of 1 |
| APPLICATION NO. | : 11/481350 | |
| DATED | : July 26, 2011 | |
| INVENTOR(S) | : Stefano B. Previdi et al. | |

It is certified that error appears in the above-identified patent and that said Letters Patent is hereby corrected as shown below:

Col. 1, line 20: "communications links located in is the same general physical"

Signed and Sealed this
Seventeenth Day of April, 2012

David J. Kappos
*Director of the United States Patent and Trademark Office*